(12) United States Patent
Zhang et al.

(10) Patent No.: US 8,822,606 B2
(45) Date of Patent: Sep. 2, 2014

(54) LOW VISCOSITY SILYL-TERMINATED POLYMERS

(75) Inventors: Ling Zhang, Missouri City, TX (US); Kamesh R. Vyakaranam, Pearland, TX (US); Sara Arshad, West Springfield, MA (US); William A. Koonce, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 61 days.

(21) Appl. No.: 13/805,952

(22) PCT Filed: Jun. 29, 2011

(86) PCT No.: PCT/US2011/042366
§ 371 (c)(1),
(2), (4) Date: Dec. 20, 2012

(87) PCT Pub. No.: WO2012/003216
PCT Pub. Date: Jan. 5, 2012

(65) Prior Publication Data
US 2013/0090429 A1    Apr. 11, 2013

Related U.S. Application Data

(60) Provisional application No. 61/359,989, filed on Jun. 30, 2010.

(51) Int. Cl.
*C08G 18/10* (2006.01)
*C08G 18/50* (2006.01)

(52) U.S. Cl.
USPC .......................................................... 525/452

(58) Field of Classification Search
CPC ........... C08G 18/7621; C08G 18/4825; C08G 18/3893; C08G 18/10
USPC .......................................................... 525/452
See application file for complete search history.

(56) References Cited

U.S. PATENT DOCUMENTS

| | | | |
|---|---|---|---|
| 4,374,237 A | 2/1983 | Berger et al. | |
| 4,448,939 A | 5/1984 | Fasolka et al. | |
| 4,798,878 A * | 1/1989 | Brinkmann et al. | 528/28 |
| 5,227,434 A * | 7/1993 | Katz | 525/419 |
| 5,539,045 A | 7/1996 | Potts et al. | |
| 5,990,257 A | 11/1999 | Johnston et al. | |
| 8,084,566 B2 | 12/2011 | Rautschek et al. | |
| 2002/0013427 A1 | 1/2002 | Tsuji et al. | |
| 2005/0215701 A1 | 9/2005 | Porsch et al. | |
| 2006/0004173 A1 | 1/2006 | Mager | |
| 2006/0205911 A1 | 9/2006 | Ludewig et al. | |
| 2007/0060714 A1 | 3/2007 | Yang et al. | |
| 2007/0100108 A1 | 5/2007 | Huang et al. | |
| 2007/0232751 A1 | 10/2007 | Ludewig et al. | |
| 2008/0076899 A1 | 3/2008 | O'Keefe et al. | |
| 2009/0137750 A1 | 5/2009 | Ludewig et al. | |
| 2013/0060000 A1 | 3/2013 | Zhang et al. | |

FOREIGN PATENT DOCUMENTS

| | | |
|---|---|---|
| EP | 1721948 A2 | 11/2006 |
| JP | 05125175 A * | 5/1993 |
| WO | 2005/042609 A1 | 5/2005 |
| WO | 2008/027499 A2 | 3/2008 |

OTHER PUBLICATIONS

PCT/US2011/042366, International Search Report and Written Opinion.
PCT/US2011/042366, International Preliminary Report on Patentability.

* cited by examiner

*Primary Examiner* — Mike M Dollinger

(57) ABSTRACT

Embodiment of the invention provide for compositions having at least one crosslinkable silyl group in each molecule. The crosslinkable silane-terminated polymer may include a reaction product of at least a polyol having a nominal functionality of at least 2 and a isocyanate capped hydrosilylated polymer. The isocyanate capped hydrosilylated polymer may include a reaction product of at least one isocyanate and a hydrosilylated polymer. The hydrosilylated polymer may include a reaction product of a the reaction of at least a) a polymer having at least one unsaturated group and at least one alcoholic hydroxyl group in each molecule and having a number average molecular weight of between about 100 and about 5000 and b) a compound having a hydrogen-silicon bond and a crosslinkable silyl group in each molecule.

16 Claims, No Drawings

LOW VISCOSITY SILYL-TERMINATED POLYMERS

CROSS-REFERENCE TO RELATED APPLICATIONS

This application claims the benefit of U.S. Provisional Patent Application No. 61/359,989, filed on Jun. 30, 2010, and fully incorporated herein by reference.

FIELD OF THE INVENTION

Embodiments of the invention relate to silyl-modified polymers and methods of producing same.

BACKGROUND OF THE INVENTION

Crosslinkable silyl group-containing polyoxyalkylene polymers are widely used as raw material polymers in sealing materials, adhesives, coating materials and the like for architectural or industrial use. Such crosslinkable silyl group-containing polyoxyalkylene polymers may be produced according to various methods, such as hydrosilyation of vinyl terminated polyethers via Williamson's ether synthesis, aminosilane reaction with isocyanate terminated prepolymers, or isocyanatosilane reaction with hydroxyl-terminated prepolymers. However, some of the methods (particularly the aminosilane reaction with isocyanate terminated prepolymers and isocyanatosilane reaction with hydroxyl-terminated prepolymers) may result in products having high viscosities which may require large amounts of diluting solvents during product formulation. Furthermore, the Williamson's ether synthesis may produce salts as byproducts which may be required to be removed, thus adding a process step.

Therefore there is a need for crosslinkable silyl group-containing polymers that have low viscosity without the formation of salts.

SUMMARY OF THE INVENTION

Embodiments of the invention provide for silyl-terminated polymers (STP) that have low viscosities, such as for example below 50 Pa·s, and that can be made in a one pot synthesis. According to an embodiment of the invention, the STP may be represented by the following formula (I):

k is a number from 0 to 4. m and n are independently numbers from 0 to 3. x is a number from 5 to 150. y is a number from 4 to 20. $R_1$, $R_2$, $R_{10}$, and $R_{11}$ are independently straight chain or branched chain alkyl groups having from about 1 to 4 carbon atoms. Each individual $R_{10}$ are the same or different and each individual $R_{11}$ are the same or different. $R_3$, $R_4$, $R_5$, $R_6$, $R_8$, and $R_9$ are independently selected from H and straight chain or branched chain alkyl groups having from about 1 to 4 carbon atoms. $R_7$ has from 2 to about 20 carbon atoms and is aliphatic, cycloaliphatic, bis-benzylic, or aromatic. If k is 0, then n is 0 and $R_1$ and $R_2$ are coupled through a carbon-carbon bond.

In one embodiment of the invention, k is 1, n is 0 or 1, at least one $R_5$ and at least one $R_9$ are H, at least one $R_6$ and at least one $R_8$ are methyl groups, one of $R_3$ and $R_4$ is a methyl group and one of $R_3$ and $R_4$ is a H, x is a number between about 20 and about 50, and y is a number between about 10 and 18.

In one embodiment of the invention, k is 1, n is 0 or 1, at least one $R_5$ and at least one $R_9$ are H, at least one $R_6$ and at least one $R_8$ are methyl groups, one of $R_3$ and $R_4$ is a methyl group and one of $R_3$ and $R_4$ is a H, x is a number between about 20 and about 50, and y is a number between about 10 and 18.

In one embodiment of the invention, a composition comprising a crosslinkable silane-terminated polymer having at least one crosslinkable silyl group in each molecule is provided. The crosslinkable silane-terminated polymer comprises a reaction product of at least a polyol having a nominal functionality of at least 2 and a isocyanate capped hydrosilylated polymer. The isocyanate capped hydrosilylated polymer comprises a reaction product of at least one isocyanate and a hydrosilylated polymer reacted at an isocyanate index of between about 100 and about 250. The hydrosilylated polymer comprises a reaction product of a hydrosilylation reaction having a hydrosilylation efficiency of at least about 70% as determined by 1H-NMR and comprising the reaction of at least a) a polymer having at least one unsaturated group and at least one alcoholic hydroxyl group in each molecule and having a number average molecular weight of between about 100 and about 5000 and b) a compound having a hydrogen-silicon bond and a crosslinkable silyl group in each molecule.

In one embodiment of the invention, a method of producing a composition including a crosslinkable silane-terminated (I)

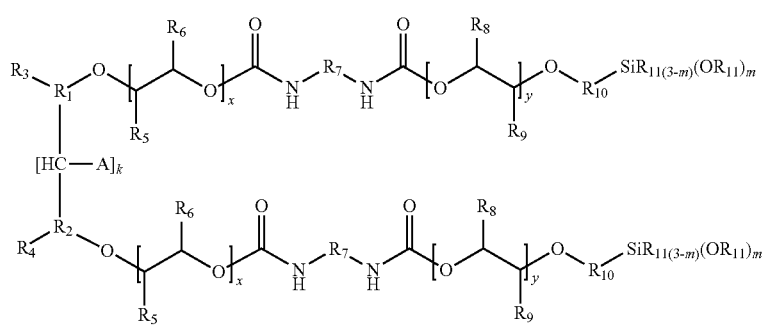

where A is either H or has the structure (II):

(II)

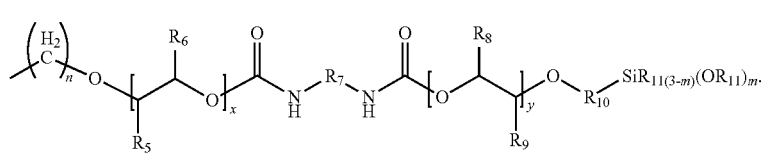

polymer having at least one crosslinkable silyl group and in each molecule is provided. The method includes providing a polymer having at least one unsaturated group and at least one alcoholic hydroxyl group in each molecule and having a number average molecular weight of between about 100 and about 5000, adding to the polymer a compound having a hydrogen-silicon bond and a crosslinkable silyl group in each molecule and a hydrosilylation catalyst to thereby carry out a hydrosilylation reaction to form a composition having hydrosilylated polyoxyalkylene polymers. The hydrosilylation reaction has a hydrosilylation efficiency of at least about 70% as determined by 1H-NMR. The method further includes capping the hydrosilylated polymers by exposing the hydrosilylated polymers to at least one isocyanate at an isocyanate index of between about 100 and about 250 to form a composition including isocyanate capped hydrosilylated polymers, and reacting the isocyanate capped hydrosilylated polymer with a polyol having a nominal functionality of at least 2 to form the composition having a crosslinkable silane-terminated polymer.

DESCRIPTION OF EMBODIMENTS OF THE INVENTION

Embodiments of the invention provide for silyl-terminated polymers (STP) that have low viscosities, such as for example below 50 Pa·s.

According to an embodiment of the invention, an STP may be represented by the following formula (I):

and straight chain or branched chain alkyl groups having from about 1 to 4 carbon atoms. $R_7$ has from 2 to about 20 carbon atoms and is aliphatic, cycloaliphatic, bis-benzylic, or aromatic. If k is 0, then n is 0 and $R_1$ and $R_2$ are coupled through a carbon-carbon bond.

In one embodiment of the invention, k is 1, n is 0 or 1, at least one $R_5$ and at least one $R_9$ are H, at least one $R_6$ and at least one $R_8$ are methyl groups, one of $R_3$ and $R_4$ is a methyl group and one of $R_3$ and $R_4$ is a H, x is a number between about 20 and about 50, and y is a number between about 10 and 18.

In one embodiment of the invention, k is 1, n is 0 or 1, at least one $R_5$ and at least one $R_9$ are H, at least one $R_6$ and at least one $R_8$ are methyl groups, one of $R_3$ and $R_4$ is a methyl group and one of $R_3$ and $R_4$ is a H, x is a number between about 20 and about 50, and y is a number between about 10 and 18.

In one one pot process embodiment of the invention, low viscosity STP may be obtained by the hydrosilylation of a polymer having at least one unsaturated group and at least one alcoholic hydroxyl group in each molecule. The hydrosilylated polymers may then be capped by exposing the hydrosilylated polymer to at least one isocyanate to form a composition including isocyanate capped hydrosilylated polymers. The isocyanate capped hydrosilylated polymers may then be reacted with a polyol having a nominal functionality of at least 2 to form the STP.

The polymer having at least one unsaturated group and at least one alcoholic hydroxyl group is not particularly

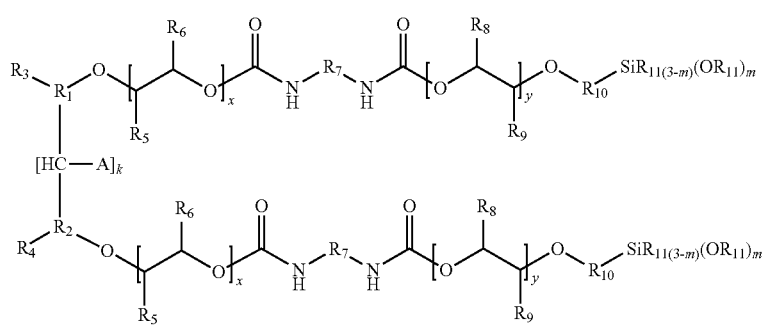

(I)

where A is either H or has the structure (II):

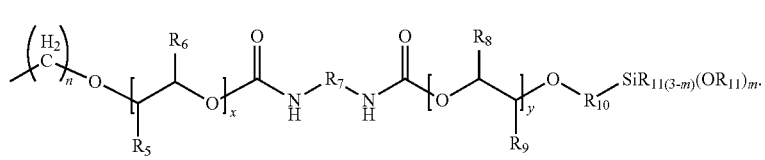

(II)

k is a number from 0 to 4. m and n are independently numbers from 0 to 3. x is a number from 5 to 150. y is a number from 4 to 20. $R_1$, $R_2$, $R_{10}$, and $R_{11}$ are independently straight chain or branched chain alkyl groups having from about 1 to 4 carbon atoms. Each individual $R_{10}$ are the same or different and each individual $R_{11}$ are the same or different. $R_3$, $R_4$, $R_5$, $R_6$, $R_8$, and $R_9$ are independently selected from H restricted, and may include any polymer as long as they include at least one unsaturated group (such as a carbon-carbon double bond or carbon-carbon triple bond) and at least one alcoholic hydroxyl group.

The polymer having at least one unsaturated group and at least one alcoholic hydroxyl group in each molecule may have a number average molecular weight of between about 100 and about 5000. All individual values and subranges from 100 to 5000 are included herein and disclosed herein; for example, the number average molecular weight can be from a lower limit of 100, 200, 300, 400, 500, 600, 700, 800, 900, 1000, 1250, 1500, or 1750 to, independently, an upper limit of 1000, 1250, 1500, 1750, 2000, 2500, 3000, 3500, 4000, 4500, or 5000.

In one embodiment, the polymer having at least one unsaturated group and at least one alcoholic hydroxyl group in each molecule may be a polyoxyalkylene polymer as described in co-pending U.S. Provisional Patent Application No. 61/348,996, filed May 27, 2010, and entitled "Methods for Producing Crosslinkable Silyl Group-Containing Polyoxyalkylene Polymers," which is hereby incorporated by reference in its entirety.

In one embodiment, the polymer having at least one unsaturated group and at least one alcoholic hydroxyl group in each molecule may be made by subjecting an epoxy compound to ring opening polymerization using an unsaturated group- and active hydrogen-containing compound as a polymerization initiator in presence of a catalyst. Catalysis for this polymerization can be either anionic or cationic, with catalysts such as KOH, CsOH, boron trifluoride, or a double cyanide complex (DMC) catalyst such as zinc hexacyanocobaltate or quaternary phosphazenium compound. The active hydrogen-containing compound that may be used as a polymerization initiator is not restricted but may be any of those compounds which are applicable in association with double metal cyanide complexes, such as, for example, compounds including an alcoholic hydroxyl, phenolic hydroxyl or carboxyl group.

The alcoholic hydroxyl-containing compound may include allyl alcohol, methallyl alcohol, trimethylolpropane monoallyl ether, trimethylolpropane diallyl ether, glycerol monoallyl ether, glycerol diallyl ether; ethylene oxide adducts or propylene oxide adducts thereof and like compounds containing at least one unsaturated group and at least one alcoholic hydroxyl group in each molecule; hydroxyl-terminated hydrocarbon compounds such as hydroxyl-terminated polybutadiene; and the like. Such active hydrogen-containing compounds serving as polymerization initiators may be used singly or a plurality thereof may be used in combination.

The monoepoxide which may be used in the ring opening polymerization may include, among others, monoepoxides having no unsaturated group such as ethylene oxide, propylene oxide, butene oxide, isobutene oxide, epichlorohydrin and styrene oxide; and unsaturated group-containing monoepoxides such as allyl glycidyl ether, methallyl glycidyl ether, glycidyl acrylate, glycidyl methacrylate, butadiene monoxide and cyclopentadiene monoxide. These may be used singly or a plurality thereof may be used in combination.

In one embodiment, the polymer having at least one unsaturated group and at least one alcoholic hydroxyl group in each molecule may be a propylene glycol monoallyl ether having a number average molecular weight between about 600 and about 100, and an OH number of between about 50 and about 90.

The polymer having at least one unsaturated group and at least one alcoholic hydroxyl group in each molecule may be hydrosilylated by reacting the polymer with a compound having a hydrogen-silicon bond and a crosslinkable silyl group in the presence of a hydrosilylation catalyst.

The compound having a hydrogen-silicon bond and a crosslinkable silyl group in each molecule, may be represented by the general formula (I) shown below:

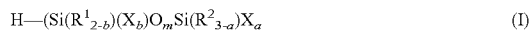         (I)

where $R^1$ and $R^2$ are the same or different and each represents an alkyl group containing 1 to 20 carbon atoms, an aryl group containing 6 to 20 carbon atoms or an aralkyl group containing 7 to 20 carbon atoms or a triorganosiloxy group represented by $R^3_3SiO$— and, when there are a plurality of $R^1$ or $R^2$ groups, they may be the same or different; $R^3$ is a univalent hydrocarbon group containing 1 to 20 carbon atoms and the three $R^3$ groups may be the same or different with one another; X represents a hydroxyl group or a hydrolyzable group and, when there are two or more X groups, they may be the same or different with each other or one another; a represents 0, 1, 2 or 3 and b represents 0, 1 or 2; b's in the m of —Si$R^1_{2-b}(X_b)O$— groups may be the same or different with each other or one another; and m represents an integer from 0 to 19 provided that the relation a+Σb≥1 should be satisfied.

The hydrolyzable group represented by X may be any of those hydrolyzable groups known in the art, for example halogen atoms and alkoxy, acyloxy, ketoximato, amino, amido, acid amide, aminoxy, mercapto and alkenyloxy groups. Among them, alkoxy groups such as methoxy, ethoxy, propoxy and isopropoxy are preferred in view of their mild hydrolyzability and the ease of handling. One to three such hydrolyzable groups may be bonded to one silicon atom and the sum (a+Σb) is preferably 1 to 5. When there are two or more hydrolyzable groups, they may be the same or different with each other or one another. The number of silicon atoms in the crosslinkable silyl group may be about 1 to 30.

In some embodiments, the compound having a hydrogen-silicon bond and a crosslinkable silyl group in each molecule represented by the above general formula (I) may include the compounds represented by the general formula (II):

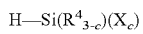

wherein $R^4$ represents an alkyl containing 1 to 20 carbon atoms, an aryl group containing 6 to 20 carbon atoms or an aralkyl group containing 7 to 20 carbon atoms or a triorganosiloxy group represented by $R^3_3SiO$— and, when there are a plurality of $R^4$ groups, they may be the same or different; $R^3$ is a univalent hydrocarbon group containing 1 to 20 carbon atoms and the three $R^3$ groups may be the same or different with one another; X represents a hydroxyl group or a hydrolyzable group and, when there are two or more X groups, they may be the same or different with each other or one another; and c represents 1, 2 or 3.

As specific examples of the compound having a hydrogen-silicon bond and a crosslinkable silyl group in each molecule, there may be mentioned halosilanes such as trichlorosilane, methyldichlorosilane, dimethylchlorosilane, phenyldichlorosilane, trimethylsiloxymethylchlorosilane and 1,1,3,3-tetramethyl-1-bromodisiloxane; alkoxysilanes such as trimethoxysilane, triethoxysilane, methyldiethoxysilane, methyldimethoxysilane, phenyldimethoxysilane, trimethylsiloxymethylmethoxysilane and trimethylsiloxydiethoxysilane; acyloxysilanes such as methyldiacetoxysilane, phenyldiacetoxysilane, triacetoxysilane, trimethylsiloxymethylacetoxysilane and trimethylsiloxydiacetoxysilane; ketoximatosilanes such as bis(dimethyl ketoximato)methylsilane, bis(cyclohexyl ketoximato)methylsilane, bis(diethyl ketoximato)trimethylsiloxysilane, bis(methyl ethyl ketoximato)methylsilane and tris(acetoximato)silane; alkenyloxysilanes such as methylisopropenyloxysilane; and the like. Preferred among them from the mild reactivity and ease of handling viewpoint are alkoxysilanes such as methyldimethoxysilane, trimethoxysilane, methyldiethoxysilane and triethoxysilane; and halosilanes such as trichlorosilane and methyldichlorosilane.

After the reaction with an unsaturated group in the manner of hydrosilylation, the halogen atom(s) in the halosilanes may be converted to some other hydrolyzable group(s) by reacting with an active hydrogen-containing compound such as a carboxylic acid, oxime, amide or hydroxylamine or a ketone-derived alkali metal enolate by an appropriate method known in the art.

The hydrosilylation catalyst may be any of those metal complexes the metal of which is selected from among the group VIII transition metals such as platinum, rhodium, cobalt, palladium and nickel. From the hydrosilylation reactivity viewpoint, $H_2PtCl_6 \cdot 6H_2O$, platinum-divinylsiloxane complexes, platinum-olefin complexes, Pt metal, RhCl$(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$ and the like are preferred, $H_2PtCl_6 \cdot 6H_2O$, platinum-vinylsiloxane complexes and platinum-olefin complexes are more preferred and platinum-vinylsiloxane complexes and platinum-olefin complexes are particularly preferred. The platinum-vinylsiloxane complexes collectively refer to compounds resulting from coordination of an intramolecular vinyl-containing siloxane, polysiloxane or cyclic siloxane, as a ligand, to a platinum atom. As typical examples of the ligand, there may be mentioned 1,1,3,3-tetramethyl-1,3-divinylsiloxane and the like. As specific examples of the olefin ligand in the platinum-olefin complex, there may be mentioned 1,5-hexadiene, 1,7-octadiene, 1,9-decadiene, 1,11-dodecadiene and 1,5-cyclooctadiene. Among the ligands specifically mentioned above, 1,1,3,3-tetramethyl-1,3-divinylsiloxane and 1,9-decadiene are preferred from the hydrosilylation reactivity viewpoint. The hydrosilylation catalyst to be used in the practice of the invention may be used singly or a combination of a plurality of species may be used.

The amount of the hydrosilylation catalyst to be used is not particularly restricted but generally is 0.00001 to 1 part by weight, preferably 0.00005 to 0.05 part by weight, more preferably 0.0001 to 0.01 part by weight, based on the weight of the metal in the catalyst, per 100 parts by weight of the polyoxyalkylene polymer having at least one unsaturated group and at least one alcoholic hydroxyl group in each molecule. When the amount is less than 0.00001 part by weight, any sufficient reaction activity may not be obtained in some instances and an amount exceeding 1 part by weight may be economically disadvantageous or cause discoloration of the polymer in certain instances.

In the above reaction, the use of a solvent is essentially unnecessary. For uniformly dissolving the catalyst and/or substrate, for controlling the reaction system temperature and/or for facilitating the addition of the substrate and/or catalyst components, however, a solvent can be used. Solvents suited for these purposes include, but are not limited to, hydrocarbon compounds such as hexane, cyclohexane, ethylcyclohexane, heptane, octane, dodecane, benzene, toluene, xylene and dodecylbenzene; halogenated hydrocarbon compounds such as chloroform, methylene chloride, chlorobenzene and o-dichlorobenzene; and ethers such as ethyl ether, tetrahydrofuran and ethylene glycoldimethyl ether, among others. Those plasticizers which can be used as plasticizers for the polyoxyalkylene polymer, such as phthalate esters and polyethers, can also be used as the reaction solvents. These may be used singly or a plurality of them may be used in combination.

The hydrosilylation reaction temperature is not particularly restricted but may for example be within the range of 0° C. to 150° C., or between the range of 20° C. to 100° C. At below 0° C., the rate of reaction may be low in some instances and, at above 150° C., side reactions involving the hydroxyl group, hydrogen-silicon bond and/or crosslinkable silyl group may proceed in certain instances. In one embodiment, the hydrosilylation reaction temperature is about 60° C.

In embodiments of the invention the polymers having at least one unsaturated group and at least one alcoholic hydroxyl group in each molecule are hydrosilylated with a hydrosilylation efficiency of at least about 70%, such as between about 70% and about 100%. All individual values and subranges from about 70 to about 100 are included herein and disclosed herein; for example, the hydrosilylation efficiency can be from a lower limit of about 70, 75, 80, 90, or 92%, to, independently, an upper limit of about 80, 85, 90, 92, 94, 95, 96, 98, 99, or 100%. This includes polymers hydrosilylated with a hydrosilylation efficiency of 80 to 95% and further includes hydrosilylated polymers capped with a hydrosilylation efficiency of 85 to 95%. As used herein, the "hydrosilylation efficiency"=[100×((number of unsaturation groups on the polyol hydrosilylated)/(total number of unsaturation groups on the polyol that were initially available for hydrosilylation)], and may be measured using $^1$H-NMR.

The hydrosilylated polymers having at least one crosslinkable silyl group and at least one hydroxyl group in each molecule (hereinafter referred to as "hydrosilylated polymer") as produced by the above described process can react with water or atmospheric moisture to give crosslinked cured products and therefore is useful as a raw material or raw material intermediate for sealing, adhesive, coating and like materials or compositions for architectural or industrial use. However, the high remaining hydroxyl group percentage of this polymer having at least one crosslinkable silyl group and at least one hydroxyl may be capped with a polyisocyanate compound.

Among the capping agents usable in the practice of the embodiments of the invention, the polyisocyanate compounds, namely compounds having two or more isocyanato groups in each molecule, include, but are not limited to, aliphatic, cycloaliphatic, arylaliphatic and aromatic isocyanates.

Examples of suitable aromatic isocyanates include the 4,4'-, 2,4' and 2,2'-isomers of diphenylmethane diisocyante (MDI), blends thereof and polymeric and monomeric MDI blends, toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimethyldiphenyl, 3-methyldiphenyl-methane-4,4'-diisocyanate and diphenyletherdiisocyanate and 2,4,6-triisocyanatotoluene and 2,4,4'-triisocyanatodiphenylether.

Mixtures of isocyanates may be used, such as the commercially available mixtures of 2,4- and 2,6-isomers of toluene diisocyantes. A crude polyisocyanate may also be used in the practice of the embodiments of the invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used.

Examples of aliphatic polyisocyanates include ethylene diisocyanate, 1,6-hexamethylene diisocyanate, isophorone diisocyanate, cyclohexane 1,4-diisocyanate, 4,4'-dicyclohexylmethane diisocyanate, 1,3-bis(isocyanatomethyl)cyclohexane, 1,4-bis(isocyanatomethyl)cyclohexane, saturated analogues of the above mentioned aromatic isocyanates, and mixtures thereof.

The coupling reaction may be performed at an isocyanate index of between about 100 and about 250. All individual values and subranges from 100 to 250 are included herein and disclosed herein; for example, the isocyanate index can be from a lower limit of 100, 105, 110, 125, 140, 150, 160, 170, 175, 180, 190, 200, 225, to, independently, an upper limit of 150, 175, 200, 225, or 250. In some embodiments the index may be between about 160 and about 200, between about 140 and about 170, or between about 150 and about 180. The isocyanate index is the ratio of isocyanate-groups over isocyanate-reactive hydrogen atoms present in a formulation, given as a percentage. Thus, the isocyanate index expresses the percentage of isocyanate actually used in a formulation with respect to the amount of isocyanate theoretically required for reacting with the amount of isocyanate-reactive hydrogen used in a formulation.

When, in the practice of the embodiments of the invention, the hydrosilylated polymer is reacted with a coupling agent such as a compound having two or more isocyanato groups in each molecule, it is not always necessary to use a catalyst. For increasing the rate of reaction or improving the degree of conversion, however, a catalyst may be used. The catalyst to be used in carrying out the coupling reaction using a polyisocyanate compound includes, but is not limited to, those catalysts mentioned in Polyurethanes: Chemistry and Technology, Part I, Table 30, Chapter 4, Saunders and Frisch, Interscience Publishers, New York, 1963, for instance.

Preferred as the urethane formation reaction catalysts usable in effecting the coupling reaction using a polyisocyanate compound because of their high activity are tin catalysts such as stannous octylate, stannous stearate, dibutyltin dioctoate, dibutyltin dioleylmaleate, dibutyltin dibutylmaleate, dibutyltin dilaurate, 1,1,3,3-tetrabutyl-1,3-dilauryloxycarbonyldistannoxane, dibutyltin diacetate, dibutyltin diacetylacetonate, dibutyltin bis(o-phenylphenoxide), dibutyltin oxide, dibutyltin bis(triethoxysilicate), dibutyltin distearate, dibutyltin bis(isononyl 3-mercaptopropionate), dibutyltinbis (isooctyl thioglycolate), dioctyltin oxide, dioctyltin dilaurate, dioctyltin diacetate and dioctyltin diversatate. Further, it is preferable to use catalysts low in activity against crosslinkable silyl groups and, thus, for example, sulfur atom-containing tin catalysts such as dibutyltin bis(isononyl 3-mercaptopropionate) and dibutyltin bis(isooctyl thioglycolate) are particularly preferred.

The isocyanate capped polymers may be coupled with a polyol having a nominal functionality of at least 2 to form the final silyl-terminated polymers. Any suitable polyol may be used. In one embodiment, a polyether polyol is used. In certain embodiments, polyether polyols having nominal functionalities of between about 2 and about 4 is used. In one embodiment, the nominal functionality is about 2, and in another about 3. In certain embodiments, polyether polyols may be used.

Polyether polyols may be prepared by adding an alkylene oxide, such as ethylene oxide, propylene oxide, butylene oxide or a combination thereof, to an initiator having from 2 to 8, preferably 2 to 4 active hydrogen atoms. Catalysis for this polymerization can be either anionic or cationic, with catalysts such as KOH, CsOH, boron trifluoride, or a double cyanide complex (DMC) catalyst such as zinc hexacyanocobaltate or quaternary phosphazenium compound. The initiator may be selected from the group consisting of neopentylglycol; 1,2-propylene glycol; trimethylolpropane; pentaerythritol; sorbitol; sucrose; glycerol; aminoalcohols such as ethanolamine, diethanolamine, and triethanolamine; alkanediols such as 1,6-hexanediol, 1,4-butanediol; 1,4-cyclohexane diol; 1,3-cyclohexanedimethanol, 1,4-cyclohexanedimethanol, 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-bishydroxymethylcyclohexane; 8,8-bis (hydroxymethyl)tricyclo[5,2,1,0$^{2,6}$]decene; Dimerol alcohol (36 carbon diol available from Henkel Corporation); hydrogenated bisphenol; 9,9(10,10)-bishydroxymethyloctadecanol; 1,2,6-hexanetriol and combination thereof. In one embodiment, the initiator is a mixture of 1,3-cyclohexanedimethanol and 1,4-cyclohexanedimethanol and is commercially available under the trade name UNOXOL from The Dow Chemical Company which is an approximate 1:1 mixture of (cis, trans) 1,3-cyclohexanedimethanol and (cis, trans) 1,4-cyclohexanedimethanol. Other initiators include other linear and cyclic compounds containing an amine. Exemplary polyamine initiators include ethylene diamine, neopentyldiamine, 1,6-diaminohexane; bisaminomethyltricyclodecane; bisaminocyclohexane; diethylene triamine; bis-3-aminopropyl methylamine; triethylene tetramine various isomers of toluene diamine; diphenylmethane diamine; N-methyl-1, 2-ethanediamine, N-Methyl-1,3-propanediamine, N,N-dimethyl-1,3-diaminopropane, N,N-dimethylethanolamine, 3,3'-diamino-N-methyldipropylamine, N,N-dimethyldipropylenetriamine, aminopropyl-imidazole.

The coupling reaction of the isocyanate capped polymers with the polyol having a nominal functionality of at least 2 may be catalyzed by the same types of catalyst used for the capping reaction above. Alternatively, the catalyst used in the capping reaction may carried forward and used in the coupling reaction.

The resulting silyl-terminated polymers may have viscosities that are below about 50 Pa·s, such as below 45, 40, 35, 30, 25, 20, 15, 10, or 8 Pa·s.

According to the embodiments of the invention, the resulting silyl-terminated polymers may be useful, among other things, to be reacted with one another to further lengthen the molecular chains for uses such as sealants, adhesives, and coatings, and combinations thereof. When silyl polymers are exposed to moisture, for example, the moisture from the atmosphere, the hydrolyzable groups which are bonded to the silicon atoms are hydrolyzed, being replaced by silicon bonded hydroxyl groups. The hydroxyl groups in turn react with each other or with other hydrolyzable groups to form siloxane (Si—O—Si) linkages. By this process the polymer molecules of the composition of the embodiments of the invention are bonded to form an infusible elastomeric material. To avoid premature curing, the compositions of the embodiments of the invention may be stored and maintained in the absence of moisture until cure is desired. Then, when cure is desired, the polymer may be exposed to atmospheric or other moisture.

Furthermore, the reaction of curing of the silyl polymer may be facilitated by use of a silanol condensation catalyst or curing accelerator. Silanol condensation catalysts or accelerators are well known in the art such as those disclosed in U.S. Pat. No. 6,355,127 and include the following: titanic acid esters, such as tetrabutyl titanate, tetrapropyl titanate, and the like; organotin compounds, such as dibutyltin dilaurate, dibutyltin maleate, dibutyltin diacetate, tin octylate, tin naphthenate, reaction products of dibutyltin oxide and phthalic acid esters, dialkyltin diacetyl acetonates, such as dibutyltin bis(acetylacetonate); dialkyltinoxides, such as dibutyltinoxide; organoaluminum compounds, such as aluminum trisacetylacetonate, aluminum trisethylacetonate, and the like; reaction products, such as bismuth salts and organic carboxylic acids, such as bismuth tris(2-ethylhexoate), bismuth tri(neodeconate), and the like; chelate compounds, such as zirconium tetracetylacetonoate, titanium tetracetylacetonate, and the like; amine compounds, such as butylamine, octylamine, dibutylamine, monethanolamine, diethanolamine, triethanolamine, diethylenetriamine, cyclohexylamine, benzylamine, and the like, or their salts with carboxylic acids, and the like. These compounds are not limited; one can use any silanol condensation catalyst which is in general use. These silanol condensation catalysts may be used individually or in combinations. Such catalysts and accelerators include tetrabutyltitanate, dibutyltin dilaurate, dibutyltin bis (acetylacetonate), and the like. The catalyst may be present in an amount of about at least about 0.1 percent by weight of the polymer, at least about 0.5 percent by weight of the polymer, at least about 1 percent by weight of the polymer, at least about 1.5 percent by weight of the polymer, or at least about 2 percent by weight of the polymer and at most about 8 percent by weight of the polymer, at most about 6 percent by weight of the polymer, at most about 5 percent by weight of the polymer, at most about 4 percent by weight of the polymer, or at most about 3.5 percent based on weight of the polymer. Such catalysts may be combined with the polymer by means within the skill in the art during the formulation of the sealant, coating, or adhesive.

The resulting cured silyl polymers are also embodiments of the invention. Similarly, the embodiments of the invention includes the sealants, adhesives, and coatings and other end uses comprising these polymers or prepolymers. Preferred properties for the silyl polymers may differ somewhat for each end use as do other components that are optionally present in compositions suitable for each.

EXAMPLES

The following examples are provided to illustrate the embodiments of the invention, but are not intended to limit the scope thereof. All parts and percentages are by weight unless otherwise indicated.

The following materials were used:

Monoallyl Ether A propylene glycol monoallyl ether having an allylic content of 3.5 wt % (0.998 mol of unsat/mol monol), a number average molecular weight of about 800, and an OH number of 70 or 2.1 wt % OH.

ACCLAIM Polyol 6300 A long-chain trifunctional polyether polyol based on propylene oxide with a molecular weight of about 6000 and a hydroxyl number of 28 mg KOH/g, available from Bayer MaterialScience.

ACCLAIM Polyol 8200 A long-chain difunctional polyether polyol based on propylene oxide with a molecular weight of about 8000 and a hydroxyl number of 14 mg KOH/g, available from Bayer MaterialScience.

Karstedt's catalyst Platinum-divinyltetramethyldisiloxane and xylene as carrier solvent, the Pt loading in the catalyst is 2 wt %, available from Gelest, Inc.

Methyldimethoxysilane Available from Gelest, Inc.

VORANATE T-80 A toluene diisocyanate (80% 2,4-toluene diisocyanate and 20% 2,6-toluene diisocyanate by weight) composition, available from The Dow Chemical Company.

DABCO T-12 A tin catalyst available from Air Products.

Dibutyltin bis(acetylacetnoate) Available from Sigma-Aldrich Co.

*VORANATE is a trademark of The Dow Chemical Company.

Test Methods

Tensile strength was measured according to ASTM standard test D1708. Elongation at break was measured according to ASTM standard test D1708. 100% Secant Modulus was measured according to ASTM standard test D1708. The number average molecular weight was determined by gel permeation chromatograpy using PEG standards, according to ASTM standard test D5296. Viscosity was measured using a rheometer AR2000 by TA Instruments. Approximately 1 mL of sample was dispensed into a 60 mm diameter 60-degree cone and plate geometry. After removal of any excess material, the viscosity test was performed by heating the sample from 20° C. to 100° C. at 3° C./min Shear rate of the test was kept constant at 0.1 $s^{-1}$.

Example 1

A hydrosilylation reaction was performed by charging Monoallyl Ether (156.7 g) into a 4-necked 250 mL pre-dried glass reactor equipped with a mechanical stirrer. Karstedt's catalyst (Approximately 0.03 g) was then added to the reactor and mixed for 2 minutes under a continuous nitrogen purge. Methyldimethoxysilane (20.36 g) was added last and mixed for 5 minutes before the entire reactor was heated to 60° C. for 2 hours. The hydrosilylation product (hereinafter referred to as Hydrosilylated Polyether 1) was analyzed using $^1$H-showing a hydrosilylation efficiency of 95.2%.

A NCO-capping reaction was carried out by charging Hydrosilylated Polyether 1 (165.1 g) into a 250mL 4-neck pre-dried glass reactor equipped with a mechanical stirrer and padded with nitrogen. A continuous nitrogen purge started as VORANATE T-80 (27.2 g, isocyanate index=171) was added to the reactor. The NCO-capping reaction was let to take place over 4 hours at 70° C. at 300 rpm mixing speed. FTIR spectra were collected both before and after the reaction to confirm a 50% isocyanate conversion. The NCO-capped intermediate is hereinafter referred to as NCO Hydrosilylated Polyether 1).

A coupling reaction/product formation step was performed by reacting NCO Hydrosilylated Polyether 1 (50 g) with ACCLAIM 8200 (165.9 g) in the presence of DABCO T-12 (0.05 g) for 2 hours at 70° C. under a continuous nitrogen purge. The resulting product (hereinafter referred to as Product 1) was characterized via gel permeation chromatography which gave 4 distinctive peaks indicating number average molecular weights of 20448, 10484, 2559 and 1084 g/mol. These four peaks are well separated, with above 80% of the total mass having the 10484 molecular weight, about ~10% having the 20448 molecular weight, and the rest of the mass distributed between the 2559 and 1084 molecular weight peaks. The viscosity of Product 1 was measured to be 10.48 Pa·s at 28.5° C.

Film formation was performed by adding dibutyltin bis (acetylacetoate) (0.5 g) to Product 1 (100 g) and a 25 mm thick film was casted and allowed to cure at room temperature, at 50% relative humidity for 7 days. Cured Product 1 has an elongation of 496.57%, 100% secant modulus of 12.31 psi, and tensile strength of 51 psi.

Example 2

A coupling reaction/product formation step was performed by reacting NCO Hydrosilylated Polyether 1 from Example 1 (50 g) with ACCLAIM 6300 (80.6 g) in the presence of DABCO T-12 (0.03 g) for 2 hours at 70° C. under a continuous nitrogen purge. The resulting product (hereinafter referred to as Product 2) was characterized via gel permeation chromatography which gave four distinctive peaks indicating number average molecular weights of 23016, 7883, 2575, and 1031 g/mol. These four peaks are well separated, with above 65% of the total mass having the 7883 molecular weight, about 20% having the 23016 molecular weight, about 10% having the 2575 molecular weight and the rest of the mass distributed between the 1031 and lower molecular weight peaks. The viscosity of Product 1 was measured to be 7.64 Pa·s at 28.5° C.

Film formation was performed by adding dibutyltin bis (acetylacetoate) (0.5 g) to Product 2 (100 g) and a 25 mm thick film was casted and allowed to cure at room temperature, at 50% relative humidity for 7 days. Cured Product 2 has an elongation of 141.09%, 100% secant modulus of 70.69 psi, and tensile strength of 95.8 psi

COMPARATIVE EXAMPLE

The procedure for obtaining Product 2 described in Example 2 was repeated except that both the isocyanate and polyol components were added the same time. In a 4-neck pre-dried glass reactor, of Hydrosilylated Polyether 1 (29.1 g) was first added followed by the addition of VORANATE T-80 (4.97 g) and ACCLAIM 6300 (57.2 g) in the presence of DABCO T-12 (0.1). The resulting comparative product has a high viscosity compared to Example 2 with a viscosity of 285.5 Pa·s at 28.1° C. The cured product has an elongation of 250.9%, 100% secant modulus of 36.6 psi and a tensile strength of 66.1 ps.

Examples 3-5

NCO-capping reaction of Hydrosilylated Polyether 1 from Example 1 was carried out as described in Example 1, but using the amounts of reactants/catalyst as indicated in Table 1. The NCO-capped hydrosilylated polyethers were then coupled as described in Example 1 but using ACCLAIM 8200 in the amounts given in Table 1. Table 1 also gives the viscosity of the finished coupled products at various temperatures.

TABLE 1

|  | Example 3 Index 160 | Example 4 Index 170 | Example 5 Index 190 |
|---|---|---|---|
| Hydrosilylated Polyether 1 (g) | 17.55 | 17.55 | 17.55 |
| VORANATE ® T-80 (g) | 2.70 | 2.87 | 3.21 |
| DABCO ® T-12 (g) | 0.0009 | 0.0009 | 0.0009 |
| Viscocity at 20° C. (Pa·s) | 11.0 | 14.1 | 17.5 |
| Viscocity at 25° C. (Pa·s) | 8.9 | 10.5 | 14.0 |
| Viscocity at 30° C. (Pa·s) | 6.8 | 7.8 | 10.2 |
| Viscocity at 40° C. (Pa·s) | 4.0 | 4.2 | 6.0 |
| Viscocity at 50° C. (Pa·s) | 2.3 | 2.5 | 3.5 |
| Viscocity at 60° C. (Pa·s) | 1.5 | 1.5 | 2.3 |
| Viscocity at 80° C. (Pa·s) | 1.0 | 1.1 | 1.3 |

While the foregoing is directed to embodiments of the present invention, other and further embodiments of the invention may be devised without departing from the basic scope thereof, and the scope thereof is determined by the claims that follow.

The invention claimed is:

1. A crosslinkable silane-terminated polymer having the structure

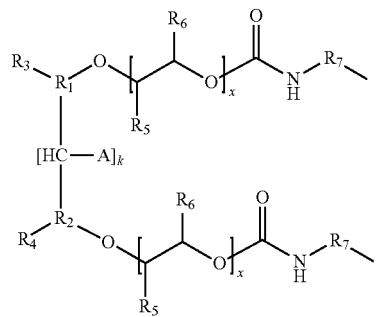

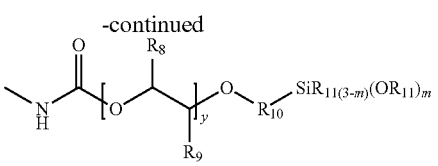

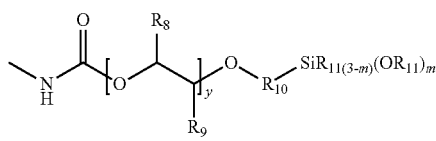

where A is either H or has the structure

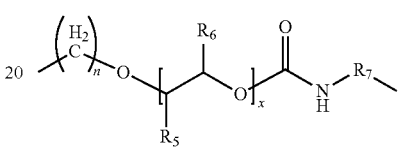

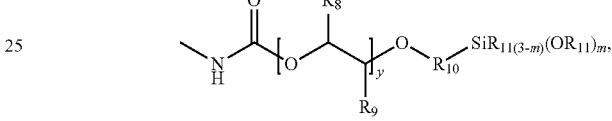

k is a number from 0 to 4, m and n are independently numbers from 0 to 3, x is a number from 5 to 150, y is a number from 4 to 20, $R_1$, $R_2$, $R_{10}$, and $R_{11}$ are independently alkyl groups having from about 1 to 4 carbon atoms, each individual $R_{10}$ are the same or different, each individual $R_{11}$ are the same or different, and $R_3$, $R_4$, $R_5$, $R_6$, $R_8$, and $R_9$ are independently selected from H and alkyl groups having from about 1 to 4 carbon atoms, $R_7$ has from 2 to about 20 carbon atoms and is aliphatic, cycloaliphatic, bis-benzylic, or aromatic, and if k is 0, then n is 0 and $R_1$ and $R_2$ are coupled through a carbon-carbon bond.

2. The crosslinkable silane-terminated polymer of claim 1, wherein k and n are 0, at least one $R_5$ and at least one $R_9$ are H, at least one $R_6$ and at least one $R_8$ are methyl groups, one of $R_3$ and $R_4$ is a methyl group and one of $R_3$ and $R_4$ is a H, x is a number between about 50 and about 90, and y is a number between about 10 and 18.

3. The crosslinkable silane-terminated polymer of claim 1, wherein k is 1, n is 0 or 1, at least one $R_5$ and at least one $R_9$ are H, at least one $R_6$ and at least one $R_8$ are methyl groups, one of $R_3$ and $R_4$ is a methyl group and one of $R_3$ and $R_4$ is a H, x is a number between about 20 and about 50, and y is a number between about 10 and 18.

4. A composition comprising the crosslinkable silane-terminated polymer of claim 1, wherein:
the crosslinkable silane-terminated polymer comprises a reaction product of at least a polyol having a nominal functionality of at least 2 and a isocyanate capped hydrosilylated polymer;
the isocyanate capped hydrosilylated polymer comprises a reaction product of at least one isocyanate and a hydrosilylated polymer reacted at an isocyanate index of between about 100 and about 250; and
the hydrosilylated polymer comprises a reaction product of a hydrosilylation reaction having a hydrosilylation efficiency of at least about 70% as determined by $^1$H-NMR and comprising the reaction of at least a) a polymer having at least one unsaturated group and at least one alcoholic hydroxyl group in each molecule and having a number average molecular weight of between about 100 and about 5000 and b) a compound having a hydrogen-silicon bond and a crosslinkable silyl group in each molecule.

5. A method of producing the crosslinkable silane-terminated polymer of claim 1, the method comprising:

providing a polymer having at least one unsaturated group and at least one alcoholic hydroxyl group in each molecule and having a number average molecular weight of between about 100 and about 5000;

adding to the polymer a compound having a hydrogen-silicon bond and a crosslinkable silyl group in each molecule and a hydrosilylation catalyst to thereby carry out a hydrosilylation reaction to form a composition comprising hydrosilylated polyoxyalkylene polymers, wherein the hydrosilylation reaction has a hydrosilylation efficiency of at least about 70% as determined by $^1$H-NMR;

capping the hydrosilylated polyoxyalkylene polymers by exposing the hydrosilylated polymer to at least one isocyanate at an isocyanate index of between about 100 and about 250 to form a composition comprising isocyanate capped hydrosilylated polymers; and reacting the isocyanate capped hydrosilylated polymer with a polyol having a nominal functionality of at least 2 to form the composition comprising a crosslinkable silane-terminated polymer.

6. The method of claim 5, wherein the polymer having at least one unsaturated group and at least one alcoholic hydroxyl group in each molecule has a number average molecular weight of between about 200 and about 2000.

7. The method of claim 6, wherein the polymer having at least one unsaturated group and at least one alcoholic hydroxyl group in each molecule comprises a polyoxyalkylene polymer.

8. The method of claim 7, wherein the polymer having at least one unsaturated group and at least one alcoholic hydroxyl group in each molecule comprises a propylene glycol monoallyl ether having a number average molecular weight between about 600 and about 100, and an OH number of between about 50 and about 90.

9. The method of claim 5, wherein the isocyanate index is between about 160 and about 200.

10. The method of claim 5, wherein the hydrosilylation efficiency is at least about 85%.

11. The method of claim 5, wherein the compound having a hydrogen-silicon bond and a crosslinkable silyl group comprises at least one of trimethoxysilane, triethoxysilane, methyldiethoxysilane, methyldimethoxysilane, phenyldimethoxysilane, trimethylsiloxymethylmethoxysilane and trimethylsiloxydiethoxysilane.

12. The method of claim 9, wherein the isocyanate comprises at least one of 4,4'-, 2,4' and 2,2'-isomers of diphenylmethane diisocyante, 2,4-toluene diisocyanate and 20% 2,6-toluene diisocyanate, or blends thereof.

13. The method of claim 5, wherein the polyol comprises a polyether polyol.

14. The method of claim 13, wherein the polyol comprises a polyether polyol based on propylene oxide.

15. The method of claim 1, wherein the crosslinkable silane-terminated polymer is cured with water to form a cured polymer.

16. An article comprising the polymer produced by the method of claim 15.

* * * * *